United States Patent [19]

Aoyama

[11] Patent Number: 5,220,148

[45] Date of Patent: Jun. 15, 1993

[54] ELECTRODE FOR PROJECTION WELDING MACHINE

[76] Inventor: Yoshitaka Aoyama, 20-11, Makitsukadai 2-cho, Sakai-shi, Osaka 590-01, Japan

[21] Appl. No.: 817,373

[22] Filed: Jan. 6, 1992

[30] Foreign Application Priority Data

Jan. 12, 1991 [JP] Japan .................. 3-069555

[51] Int. Cl.$^5$ ............................. B23K 11/14
[52] U.S. Cl. ........................ 219/93; 219/119
[58] Field of Search .......... 219/93, 117.1, 86.25, 219/86.8, 119, 120

[56] References Cited

U.S. PATENT DOCUMENTS

| | | | |
|---|---|---|---|
| 2,903,562 | 9/1956 | Emmons et al. | 219/93 |
| 3,476,905 | 11/1969 | Larsen | 219/93 |

FOREIGN PATENT DOCUMENTS

| | | | |
|---|---|---|---|
| 1-226623 | 9/1989 | Japan | 219/93 |
| 1-299781 | 12/1989 | Japan | 219/93 |
| 2-20671 | 1/1990 | Japan | 219/93 |
| 2-108472 | 4/1990 | Japan | 219/119 |
| 2-182383 | 7/1990 | Japan | 219/93 |
| 2-205274 | 8/1990 | Japan | 219/119 |
| 2-303685 | 12/1990 | Japan | 219/93 |
| 3-128178 | 5/1991 | Japan | 219/93 |

Primary Examiner—Geoffrey S. Evans
Attorney, Agent, or Firm—Pollock, VandeSande & Priddy

[57] ABSTRACT

An electrode for a projection welding machine having a parts receiving hole is characterized in that a heat insulating element of magnetic material extending to the inlet side of the receiving hole is connected to a magnet disposed in the receiving hole and that the magnet itself is positioned adjacent a cooling hole.

1 Claim, 1 Drawing Sheet

ELECTRODE FOR PROJECTION WELDING MACHINE

BACKGROUND OF THE INVENTION

1. Field of the Invention

This invention relates to an electrode for a projection welding machine, of the type having a parts receiving hole, said electrode being characterized in that a magnet is placed in said receiving hole.

2. Description of the Prior Art

As for electrodes of this type, mention may be made of "Welding Electrode for Bar-Like Parts" (applied for patent on Jul. 9, 1963 (2. complete)) and "Method of Introducing Bar-Like Parts" (applied for patent on April 1 (3)), which I invented. The former includes a magnet installed in the innermost region of the guide hole of the electrode to assist a bar-like part in advancing into the guide hole. The latter includes a magnet adapted to be vertically moved in the electrode, and a guide pin disposed between a bar-like part and the magnet, the magnetic force being transmitted to a bar-like part through the guide pin.

In the former mentioned in the paragraph of Prior Art, although the magnet is disposed in the innermost region of the guide hole, the lack of a construction for dissipating the heat transferred to the magnet presents a problem that the magnetic force decreases when the magnet is overheated. On the other hand, in the latter, although the presence of the guide pin limits the transfer of heat to the magnet, it presents a problem similar to the one in the former in the dissipation of heat from the magnet.

SUMMARY OF THE INVENTION

The present invention is intended to solve the problems described above and provides an electrode for a projection welding machine, said electrode having a parts receiving hole, said electrode being characterized in that a heat insulating element of magnetic material extending to the inlet side of the receiving hole is connected to a magnet placed in the innermost region of the receiving hole adjacent to a cooling hole, the arrangement being such that the transfer of heat to the magnet is limited by the heat insulating element while the heat transferred to the magnet is removed through the cooling hole, thereby positively cooling it.

DESCRIPTION OF THE PREFERRED EMBODIMENTS

Figure 4:
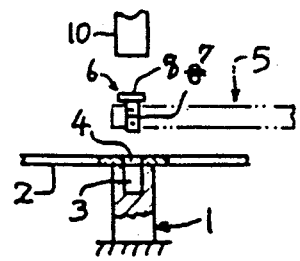
FIG. 4 is a schematic side view of a welding device shown in its entirety.

FIG. 4 is a complete side view. A steel plate part 2 is placed on a fixed electrode 1 such that a receiving hole 3 and a passage hole 4 respectively formed in the two are aligned with each other, as shown. Parts feeding means shown in phantom lines is denoted by the reference character 5 and embodied as by a guide rail or an advancing and retracting rod. The part 6 in this embodiment is a projection bolt employed by way of example, said projection bolt comprising a stem 7, a flange 8 integral therewith and projections 9 (see FIG. 1) for welding. The reference character 10 denotes a movable electrode paired with the fixed electrode 1.

Figure 1:
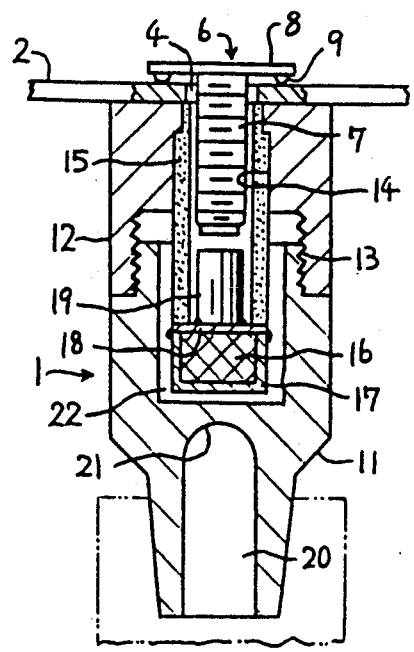
FIG. 1 is a side view, in longitudinal section, of an electrode.

An embodiment shown in FIG. 1 will now be described. The electrode 1 comprises a fixed portion 11 and cap portion 12 which are integrated by a threaded portion 13, said cap portion 12 being formed with a receiving hole 14 having an insulating sleeve 15 of synthetic resin force-fitted therein. The insulating sleeve 15 is extended downward and a magnet (permanent magnet) 16 is attached to the lower end thereof. In the case of FIG. 1, the magnet 16 is housed in an iron container 17, and a lid plate 18 made of a nonmagnetic material, for example, stainless steel, is welded to the upper surface thereof. A heat insulating element 19, disposed in the insulating sleeve 15, is made of iron, which is a magnetic material, and is welded at its lower end to the lid plate 18 and extends to the inlet side of the receiving hole. The fixed portion 11 is formed with a cooling hole 20 into which cooling water is introduced, with the magnet 16 disposed as close to the upper region 21 of the cooling hole 20 as possible. In addition, since the container 17 is made of iron, an air gap 22 for insulation is provided.

The operation of the embodiment shown in FIG. 1 will now be described. Until the projections 9 for welding melt away, there is a slight clearance between the lower surface of the stem portion 7 and the upper surface of the heat insulating element 19. Since the magnetic force acts on the stem portion 7 through the heat insulating element 19, the stem portion 7 is subjected to the magnetic force when it is advanced into the receiving hole 14, whereby smooth reception can be effected. When the projections 9 melt away and the flange 8 is contacted with the steel part 2, the aforesaid clearance becomes very small or zero to allow them to contact each other. At this time, the heat transferred from the stem portion 7 to the magnet 16 is limited by the heat insulating element 19, and the magnet is cooled through the upper region 21 of the cooling hole 20. Further, if the heat insulating element 19 is housed in the insulating sleeve 15 as in the case of this embodiment, the heat insulating element 19 itself is also prevented from being overheated from the outside.

Figure 2:
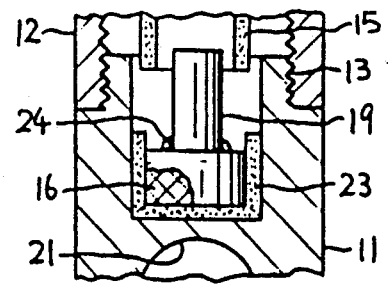
FIG. 2 is a fragmentary side view, in longitudinal section, of an electrode.

The embodiment shown in FIG. 2 includes a magnet 16 disposed in a container 28 made of an insulating material, for example, synthetic resin, the heat insulating element 19 being fixed on the upper surface of the magnet 16 by an adhesive agent 24.

Figure 3:
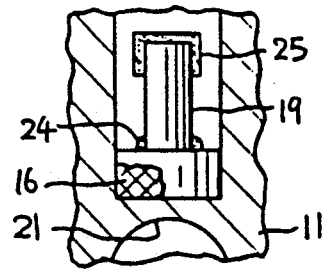
FIG. 3 is a fragmentary side view, in longitudinal section, of an electrode.

The embodiment shown in FIG. 3 includes a magnet 16 directly introduced into the fixed portion 11, with a heat insulating element 19 attached to the upper surface of the magnet 16 as in the case of FIG. 2, and with an insulating cap 25 fitted on the heat insulating element.

According to the present invention, the transfer of heat during welding is limited by the heat insulating element, and the heat transferred to the magnet is positively absorbed by the cooling hole; therefore, there is no possibility of the magnet being overheated and hence the property of the magnet can be maintained normal. And the problems described in the paragraph of prior art can be solved.

What is claimed is:

1. An electrode for a projection welding machine, said electrode having a parts receiving hole, said electrode being characterized in that a heat insulating element of magnetic material extending to the inlet side of the receiving hole is connected to a magnet positioned in the innermost region of said receiving hole adjacent a cooling hole.

* * * * *